(No Model.)
G. W. WILSON.
SEPARATOR AND PURIFIER FOR MEAL, &c.
No. 281,655. Patented July 17, 1883.
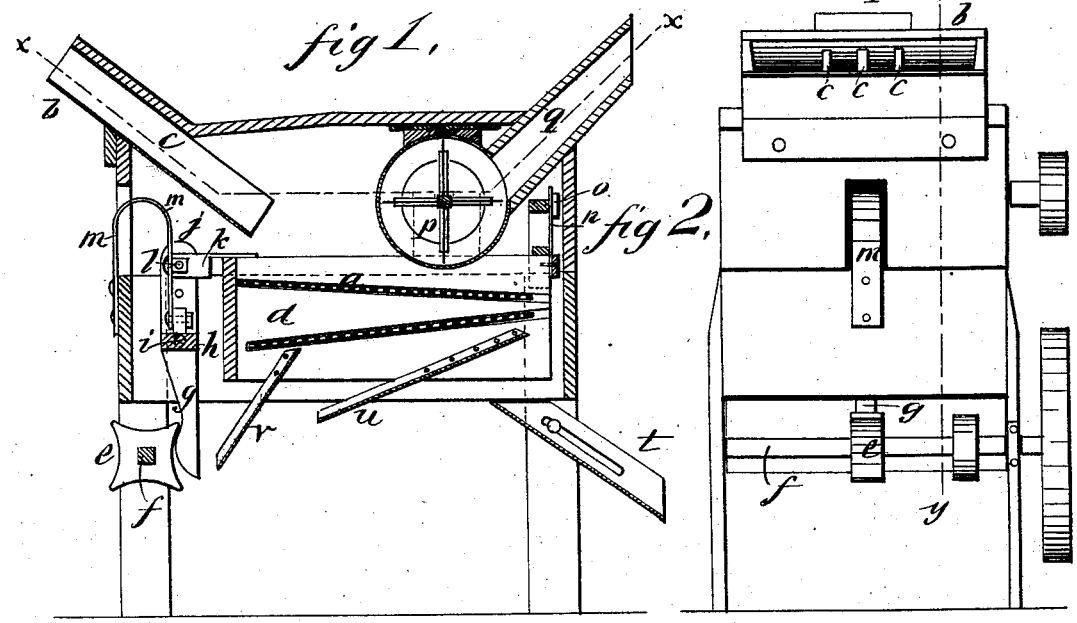
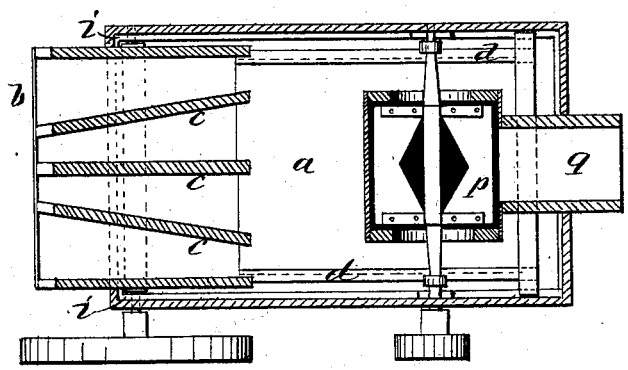
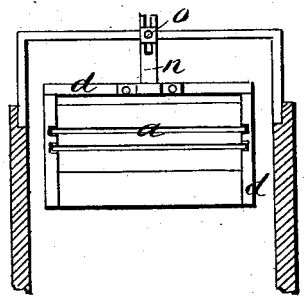
WITNESSES:
Chas. T. Howell.
C. Sedgwick.
INVENTOR:
G. W. Wilson
BY Munn & Co.
ATTORNEYS.

United States Patent Office.

GEORGE W. WILSON, OF LANESBOROUGH, MINNESOTA, ASSIGNOR OF ONE-HALF TO BUEL A. MAN, OF SAME PLACE.

SEPARATOR AND PURIFIER FOR MEAL, &c.

SPECIFICATION forming part of Letters Patent No. 281,655, dated July 17, 1883.

Application filed April 21, 1883. (No model.)

*To all whom it may concern:*

Be it known that I, GEORGE W. WILSON, of Lanesborough, in the county of Fillmore and State of Minnesota, have invented a new and Improved Separator and Purifier for Meal, &c., of which the following is a full, clear, and exact description.

Reference is to be had to the accompanying drawings, forming part of this specification, in which similar letters of reference indicate corresponding parts in all the figures.

Figure 1 is a sectional elevation of my improved separator and purifier, taken on the line $y\,y$ of Fig. 2. Fig. 2 is an end view. Fig. 3 is a horizontal section taken on the line $x\,x$ of Fig. 1, and Fig. 4 is a detail in transverse sectional elevation.

For distributing the grain evenly and uniformly across the upper screen or sieve, $a$, onto which it is discharged from the spout $b$, I make a series of partitions, $c$, in the spout, preferably three in number, and inclining the two outside ones so as to spread the grain on the sieve, and thus distribute it at once, and thereby secure much better action than when the grain falls mainly in one locality and has to be spread out on the sieve.

For producing the shaking motion of the shoe $d$, wherein the sieves are mounted, I propose to use a four-pointed cam or tappet wheel, $e$, on a rotary shaft, $f$, to act against the arm $g$ of a rocker, $h$, pivoted at $i$ to the frame or case of the machine, and carrying upright arms $j$, to which lugs $k$, extending from the end of the shoe $d$, are pivoted at $l$, said pivots being adjustable up and down on said arms, to alter the throw of the shoe without change of the cam. This cam device gives four shakes to one revolution instead of two, as an eccentric or crank operates, thus enabling the driving-shaft to run slower for a given speed of the shoe. Like a crank or eccentric, the cam will act alike on the shoe whichever way it runs. The spring $m$ is employed in connection with the cam to produce the reverse motions. In connection with this arrangement for working the shoe, I propose to suspend it at the opposite end by the slotted flexible plate $n$ and a clamping-bolt, $o$, by which the level or inclination from end to end may be altered at will.

For effecting the separation of the light matters from the grain, middlings, meal, and other matters being treated, I propose to employ a suction-blower, $p$, in the space over the upper sieve, $a$, to draw the air up through the sieves and carry along with it the light particles to be discharged which are to be forced out through the spout $q$. The power of the blast will be regulated by suitable slides, valves, or gates to the requirements of the work in hand, said gates being arranged in the sides of the case or in a bottom that is to be attached in practice to admit the air at the required place or places, and in the required amount, according to whether it be light fine middlings or coarser meal, and heavier grain of wheat, oats, or other substance, for which the sieves will be arranged on the shoe so as to be changed at will to use fine bolting-cloth, wire-gauze, or coarser screen-wire.

Any preferred number and approved arrangement of sieves will be employed, and with them I propose to employ adjustable aprons $t\,u\,v$, and the like, so connected by bolts and slots, pins and holes, that they may be shifted at will with relation to each other and to the sieves for grading the substance under treatment, as may be desired.

Having thus described my invention, I claim as new and desire to secure by Letters Patent—

In a separator and purifier, the combination, with the pivoted sieve-shoe $d$, of the rocker $h$, having the recessed curved arm $g$, and the upright arms $j$, lugs $k$, connecting together the shoe and the arms $j$ of the rocker $h$, inverted-U-shaped spring $m$, and the pointed cam $e$, adapted to operate on the arm $g$ of the rocker, essentially as shown and described, and for the purpose set forth.

GEORGE W. WILSON.

Witnesses:
I. S. KIMBER,
H. J. COOK.